United States Patent Office 3,175,592
Patented Mar. 30, 1965

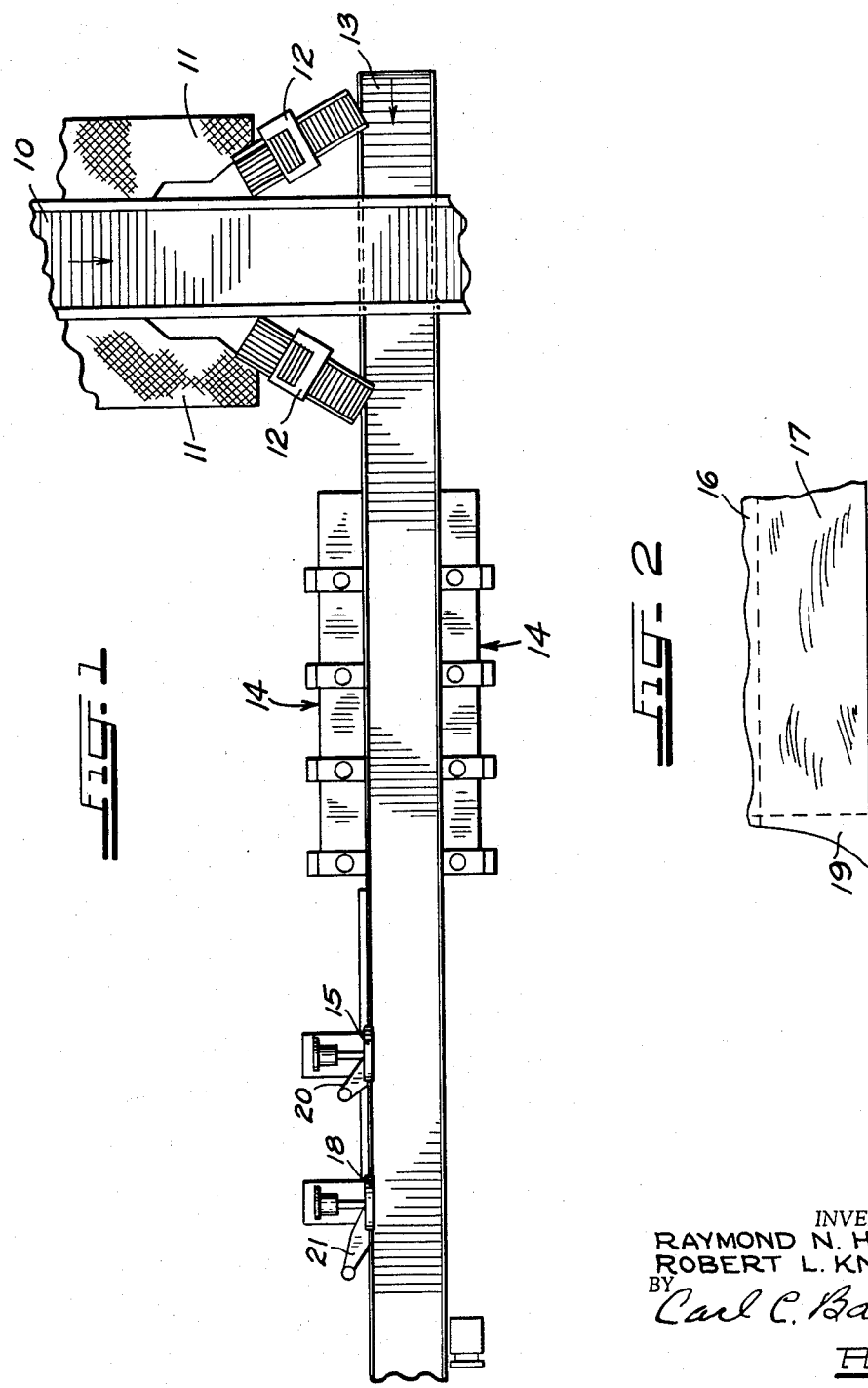

3,175,592
RECOVERY OF SAUSAGE MEAT FROM HOG BELLIES
Raymond N. Harris, Omaha, Nebr., and Robert L. Knauss, Council Bluffs, Iowa, assignors to Armour and Company, Chicago, Ill., a corporation of Delaware
Filed Sept. 27, 1962, Ser. No. 226,652
4 Claims. (Cl. 146—241)

This invention relates to a process for recovering meat from hog bellies in a condition suitable for incorporation into a sausage formulation.

It is well-known that the meat packing industry is highly efficient in finding uses for most, if not all parts of slaughtered animals. Of course, depending upon the particular use to which the various parts are placed, these parts have a great variation in value. For example, the pancreas of a slaughtered animal is very valuable since insulin is recovered therefrom, whereas other parts, such as fat trimmings which are rendered, are much less valuable. Because of this, the meat industry is constantly searching for new ways to use these less valuable parts so as to upgrade their value.

In known methods for processing hog bellies for use as bacon, during the shaping of the belly, certain pieces are trimmed and passed to rendering. Specifically, two rather large pieces that are trimmed from a hog belly are the "bootjack" and the "belly strip." Generally, the bootjack is the portion of the hog belly which was adjacent to the ham or hind leg of the hog and the belly strip is the strip along the center edge of the belly.

Heretofore, it has been considered to be most efficient to trim the bootjack and belly strip from the hog belly immediately after the separation of the belly from the fat-back. The reason is that the hog belly may then be processed in the normal manner for ultimate use as bacon, while at the same time the belly strips and bootjacks may be further processed for ultimate use in rendering. In the further processing of the bootjacks and belly strips, these pieces are passed to trimmers who manually trim pieces of lean from the relatively large pieces of fat, the trimmed lean being used in sausage formulations and the aft being sent to the inedible rendering tanks. The fat portions of the belly strips and bootjacks are passed to the inedible rendering tanks because the fat contains skin which is not suitable for human consumption and so cannot be used in sausage products. Even though it is conceivable that the skin could be removed from the belly strips and bootjacks, it would not be economically justified to remove skin and other imperfections, such as hair roots, from these relatively small pieces. Clearly, it would be highly desirable if a process could be devised for utilizing the bootjack and belly strip, including both fat and lean portions, in a sausage formulation, while at the same time eliminating the manual operation of trimming lean meat from the bootjack and belly strip. If such a method could be devised, there would be a substantial saving in two areas—first there would be a saving in labor costs and secondly the value of the bootjack and belly strip would be substantially upgraded.

It is therefore the primary object of this invention to provide a method for recovering hog belly pieces, containing fat and lean, in a condition suitable for direct incorporation into a sausage formulation.

It is also an object of this invention to upgrade the value of hog belly trimmings.

It is a further object of this invention to eliminate labor costs involved in re-trimming bootjacks and belly strips.

It is still a further object of this invention to substantially reduce the time required to process belly strips and bootjacks.

It is another object of this invention to use bootjacks and belly strips directly in sausage formulation.

Further purposes and object of this invention will appear as the specification proceeds.

It has now been discovered that the above objects may be accomplished by skinning the hog belly, following the splitting of the belly portion from the fatback portion of a carcass half, removing the remaining imperfections such as hair roots and pieces of skin, removing the skinned bootjacks and belly strips from the belly portion and finally incorporating the skinned bootjacks and belly strips directly into a desired sausage formulation.

By skinning the bellies and by removing the remaining imperfections, such as hair roots, prior to trimming the bootjacks and belly strips from the carcass, the thus trimmed bootjacks and belly strips are free of skin and other imperfections. These pieces, containing roughly 75% fat and 25% lean and no skin, may be directly included, in suitable proportions, in a sausage formulation, such as is used for fresh pork sausage. The particular sausage formulation is not important from the standpoint of this invention, but rather what is important is that the thus trimmed meat is suitable for human consumption since skin no longer remains on the bootjacks or belly strips.

Further, it is no longer necessary to re-trim pieces of lean from the belly strips or bootjacks since the entire trimmed pieces are in an edible condition and are suitable for use as sausage components. The elimination of the re-trimming operation provides a substantial reduction both in labor and in the total time required for processing belly strips and bootjacks.

In the accompanying drawings there is a specific illustration of one embodiment useful for practicing the present invention, wherein:

FIG. 1 is a top plan view of equipment suitable for practicing the present invention; and FIG. 2 is a top plan view of a hog belly half, illustrating the general location of the bootjack and the belly strip.

With reference to FIG. 1, conveyor 10 moves in the direction indicated by the arrow and carries belly halves 17 and fatbacks, following the splitting of the bellies 17 from the fatbacks. Operators stand on grates 11 and direct the bellies 17 through skinning machines 12 and the fatbacks continue down conveyor 10 for further processing. Each belly half 17 is skinned in the skinning machines 12. Although, skinning may be performed manually, it is desirable that automatic devices, such as Townsend skinning machines be used.

The skinned bellies 17 fall on belly conveyor 13 which carries the bellies in a direction indicated by the arrow. At the stations generally indicated by the reference number 14, a number of operators are positioned for removing pieces of skin that may remain on the carcass after they have been passed through the skinning machine and also for removing any hair roots, bruises, cuts or other imperfections.

After the hair roots and skin pieces are removed, the bellies 17 are returned to conveyor 13. The bellies 17 are then aligned with a shadow line and passed through knife 15 for the removal of the belly strip 16 from the belly 17. The belly half 17 is then turned, aligned with another shadow line and passed through knife 18 where the bootjack 19 is removed from the belly 17. It is to be understood that the belly strips 16 and bootjacks 19 may be removed from the bellies 17 manually, as by the use of straight knives. However, for attaining the maximum advantages of the present invention, it is preferred that power driven knives be used and it is particularly advantageous to use the apparatus disclosed in our co-pending Patent application Serial No. 226,652.

The belly strip 16 is passed into chute 20 and the bootjack 19 is passed into the chute 21, and both are passed on to the sausage formulation operation where each is included directly as an ingredient in a desired sausage mixture.

From the above description of the present inventive process, it is seen that all the objects previously set forth have been accomplished. In the first place, the belly strip 16 and bootjack 19 are processed in such a manner that they are in edible condition and are suitable for incorporation into a sausage formulation without further processing. Further, trimming of the lean meat from the belly strips and bootjacks is no longer required since the entire bootjack or belly strip is used in the sausage formulation. Therefore, the present invention provides a method for upgrading the value of belly trimmings while at the same time substantially reducing costs of processing such trimmings.

While there has been a detailed description of one embodiment of the present invention, it is to be understood that all equivalents obvious to those having skill in the art are to be included within the scope of the invention, as claimed.

We claim:

1. In a process for recovering hog belly trim pieces, containing both lean and fat portions, in a condition suitable for direct incorporation into a sausage mixture, the steps of removing substantially all the skin from a hog belly, removing remaining pieces of skin and other imperfections from said belly, separating said trim portions from said belly, and incorporatnig said portions directly into a sausage formulation.

2. In a process for recovering belly strips and bootjacks from hog bellies in a condition suitable for direct incorporation into a sausage formulation, the steps of skinning the entire bellies, separating said bootjacks and belly strips from the skinned bellies, and directly incorporating the bootjacks and belly strips into a sausage formulation.

3. In a process for recovering belly strips and bootjacks from hog bellies in a condition suitable for incorporation into a sausage formulation, the steps of initially removing substantially all of the skin from said bellies, removing imperfections from the skinned bellies, severing the belly strips and bootjacks from the skinned bellies, and incorporating the bootjacks and belly strips in a sausage formulation.

4. A process for recovering fat-containing-lean pieces from hog bellies in a condition suitable for use in sausage formulations, the steps of first removing substantially all of the skin from the bellies, removing hair roots and other imperfections from the skinned bellies, severing the fat-containing-lean pieces from the skinned bellies, and recovering the fat-containing-lean pieces in edible condition and suitable for use as an ingredient in a sausage formulation.

References Cited by the Examiner
UNITED STATES PATENTS 2,839,113 6/59 Townsend _____ 146—78
3,008,831 11/61 Christianson _____ 99—109

J. SPENCER OVERHOLSER, *Primary Examiner.*